(12) United States Patent
Li et al.

(10) Patent No.: US 10,629,137 B2
(45) Date of Patent: Apr. 21, 2020

(54) DISPLAY DEVICE

(71) Applicant: BOE TECHNOLOGY GROUP CO., LTD., Beijing (CN)

(72) Inventors: Pan Li, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 24 days.

(21) Appl. No.: 15/981,128

(22) Filed: May 16, 2018

(65) Prior Publication Data
US 2019/0108796 A1 Apr. 11, 2019

(30) Foreign Application Priority Data
Oct. 11, 2017 (CN) .................... 2017 2 1312412 U

(51) Int. Cl.
G09G 3/34 (2006.01)
G09G 3/20 (2006.01)
G09G 3/36 (2006.01)
G02F 1/1335 (2006.01)
F21V 8/00 (2006.01)
G02B 6/00 (2006.01)
G02F 1/13357 (2006.01)

(52) U.S. Cl.
CPC ............ G09G 3/3406 (2013.01); G02B 6/00 (2013.01); G02F 1/133504 (2013.01); G02F 1/133528 (2013.01); G02F 1/133555 (2013.01); G09G 3/20 (2013.01); G09G 3/36 (2013.01); G02F 2001/133531 (2013.01); G02F 2001/133618 (2013.01); G02F 2001/133628 (2013.01); G02F 2201/58 (2013.01); G02F 2203/09 (2013.01); G09G 2320/0626 (2013.01); G09G 2320/08 (2013.01); G09G 2330/021 (2013.01); G09G 2360/144 (2013.01)

(58) Field of Classification Search
USPC .......................................................... 345/207
See application file for complete search history.

(56) References Cited

U.S. PATENT DOCUMENTS

| 6,124,971 A * | 9/2000 | Ouderkirk | B32B 27/36 359/485.03 |
| 2003/0071945 A1* | 4/2003 | Kim | G02F 1/133555 349/113 |
| 2006/0291251 A1* | 12/2006 | Huang | G02B 6/0036 362/615 |
| 2007/0076434 A1* | 4/2007 | Uehara | G02F 1/133615 362/616 |
| 2009/0254351 A1* | 10/2009 | Shin | G06F 3/167 704/275 |

(Continued)

Primary Examiner — Chineyere D Wills-Burns
(74) Attorney, Agent, or Firm — Kinney & Lange, P.A.

(57) ABSTRACT

A display device is provided, including a display panel and a backlight component configured to provide a backlight to the display panel and a display controller. The backlight component includes a standby display backlight component and a normal display backlight component with the standby display backlight component being configured to provide the backlight to the display panel during a standby display mode. The display controller includes a display driver, a data memory, a signal switcher, and a mode controller configured to control the display panel to switch between a normal display mode and the standby display mode.

11 Claims, 5 Drawing Sheets

(56) References Cited

U.S. PATENT DOCUMENTS

| | | | |
|---|---|---|---|
| 2009/0294266 A1* | 12/2009 | Ahlgren | H01H 13/83 200/314 |
| 2010/0107069 A1* | 4/2010 | Shiga | H04M 1/72522 715/702 |
| 2010/0225640 A1* | 9/2010 | Vieri | G06F 1/3218 345/214 |
| 2013/0265340 A1* | 10/2013 | Ahn | G09G 5/02 345/690 |
| 2016/0275882 A1* | 9/2016 | Duan | G09G 3/3406 |
| 2018/0196184 A1* | 7/2018 | Lin | G02B 6/0036 |

* cited by examiner

DISPLAY DEVICE

CROSS-REFERENCE TO RELATED APPLICATION

This application claims a priority to Chinese Patent Application No. 201721312412.4 filed on Oct. 11, 2017, the disclosure of which is incorporated in its entirety by reference herein.

TECHNICAL FIELD

The present disclosure relates to the field of display technology, in particular to a display device.

BACKGROUND

Products such as mobile phones, tablet computers and televisions are display devices often used in our daily life, which may facilitate our work, display pleasing pictures and spice up our daily life.

The above display device not only displays contents required by the user, but also the information that the display device brings itself, such as year, month and date, so as to enable the user to decide whether to view the images displayed by the display device as need. However, the display device in the standby state can display neither the required contents nor the information the display device brings itself. For example, in the standby state, in the case that the user wants to know the current time through the display device, the user needs to wake up the display device, to switch display device from the standby state to the normal display state so as to obtain the time information. However, the power consumption required for waking up the display device is relatively high, and the hardware loss of the display device may be large in the case that the display device is waken up frequently.

SUMMARY

A display device is provided in the present disclosure, including a display panel, a backlight component configured to provide a backlight to the display panel and a display controller, where the backlight component includes a standby display backlight component and a normal display backlight component, the standby display backlight component is configured to provide the backlight to the display panel during a standby display. The display controller includes a display driver, a data memory, a signal switcher and a mode controller configured to control the display panel to switch between a normal display mode and a standby display mode.

Optionally, an input end of the mode controller is coupled to a preset button and configured to control the signal switcher, the display driver, the normal display backlight component and the standby display backlight component, and the signal switcher is configured to control a normal display signal terminal and a standby display signal terminal.

Optionally, an output end of the mode controller is coupled to a control end of the signal switcher, a control end of the display driver, a control end of the normal display backlight component and a control end of the standby display backlight component, and an output end of the signal switcher is coupled to the normal display signal terminal and the standby display signal terminal coupled to the data memory, and the normal display signal terminal and the standby display signal terminal are coupled to an input end of the display driver.

Optionally, the signal switcher includes a standby display electromagnetic switch and a normal display electromagnetic switch, and the standby display electromagnetic switch is at the standby display signal terminal, the normal display electromagnetic switch is at the normal display signal terminal, and an output end of the mode controller is coupled to a control end of the standby display electromagnetic switch and a control end of the normal display electromagnetic switch.

Optionally, the display driver includes a time sequence controller, a data driver and a gate driver, and the display panel includes an array substrate including thin film transistors arranged in an array form; an output end of the mode controller is coupled to a control end of the time sequence controller, the normal display signal terminal and the standby display signal terminal are coupled to an input end of the time sequence controller, an output end of the time sequence controller is coupled to an input end of the data driver and an input end of the gate driver, an output end of the data driver is coupled to a signal input end of each thin film transistor, and an output end of the gate driver is coupled to a control end of each thin film transistor.

Optionally, a first polarizer layer is at a light incident surface of the display panel, a second polarizer layer is at a light emitting surface of the display panel, and the first polarizer layer is between a light emitting surface of the standby display backlight component and the light incident surface of the display panel; the display device further includes a first transflective film between the first polarizer layer and the light incident surface of the display panel, a polarization direction of the first transflective film is identical to a polarization direction of the first polarizer layer.

Optionally, a diffuse reflection structure is at a surface of the first transflective film adjacent to the display panel.

Optionally, a second transflective film is at a surface of the first polarizer layer away from the display panel, and a polarization direction of the second transflective film is identical to a polarization direction of the first polarizer layer.

Optionally, the display panel includes a standby display region within a normal display region, the normal display backlight component includes a light guide sheet, a plurality of normal display light sources corresponding to the normal display region and a plurality of standby display light sources corresponding to the standby display region, where the normal display light sources are at a first side of a light incident surface of the light guide sheet, and the standby display light sources are at a second side of the light incident surface of the light guide sheet.

Optionally, a control end of the normal display backlight component includes a normal display backlight controller, and a control end of the standby display backlight component includes a standby display backlight controller, a light sensor, a logical AND gate calculation circuitry and a logical NOT gate calculation circuitry; an output end of the mode controller is coupled to an input end of the normal display backlight controller, an output end of the normal display backlight controller is coupled to the normal display light sources, an output end of the light sensor is coupled to a first input end of the logical AND gate calculation circuitry, the output end of the mode controller is coupled to a second input end of the logical AND gate calculation circuitry, an output end of the logical AND gate calculation circuitry is coupled to an input end of the standby display backlight controller via the logical NOT gate calculation circuitry, an output end of the standby display backlight controller is coupled to the standby display light sources.

Optionally, the display panel includes a standby display region within a normal display region, the normal display backlight component includes a light guide sheet, a plurality of normal display light sources corresponding to the normal display region, where a part of the normal display light sources serves as standby display light sources corresponding to the standby display region.

Optionally, a control end of the standby display backlight component includes a light sensor, a logical AND gate calculation circuitry and a logical NOT gate calculation circuitry; an output end of the mode controller is coupled to a control end of a power supply electromagnetic switch, an output end of the light sensor is coupled to a first input end of the logical AND gate calculation circuitry, the output end of the mode controller is coupled to a second input end of the logical AND gate calculation circuitry, an output end of the logical AND gate calculation circuitry is coupled to, via the logical NOT gate calculation circuitry, the control end of the power supply electromagnetic switch of each standby display light sources.

Optionally, the normal display light sources and the standby display light sources are side-light type backlight sources, and the first side of the light incident surface of the light guide sheet is adjacent to the second side of the light incident surface of the light guide sheet.

Optionally, the normal display light sources and the standby display light sources are side-light type backlight sources, and the first side of the light incident surface of the light guide sheet is opposite to the second side of the light incident surface of the light guide sheet.

BRIEF DESCRIPTION OF THE DRAWINGS

The present disclosure will be described hereinafter in conjunction with the drawings and embodiments. The embodiments are for illustrative purposes only, but shall not be used to limit the scope of the present disclosure.

DRAWING REFERENCES

1—normal display backlight component, 11—light sensor, 12—logical AND gate calculation circuitry, 13—logical NOT gate calculation circuitry, 14—standby display backlight controller, 15—normal display backlight controller, 100—m power supply electromagnetic switches, 100a—k power supply electromagnetic switches, 101—m normal display light sources, 101a—k normal display light sources, 102—k standby display light sources, 2—display panel, 20—liquid crystal layer, 21—array substrate, 22—color filter substrate, 3—first polarizer layer, 4—second polarizer layer, 5—first transflective film, 50—groove, 6—second transflective film, 7—mode controller, 70—preset button, 8—display driver, 81—time sequence controller, 82—gate driver, 83—data driver, 9—signal switcher, 91—standby display electromagnetic switch, 92—normal display electromagnetic switch, 900—data memory, 901—standby display signal terminal, 902—normal display signal terminal, A—normal display region, B—standby display region.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
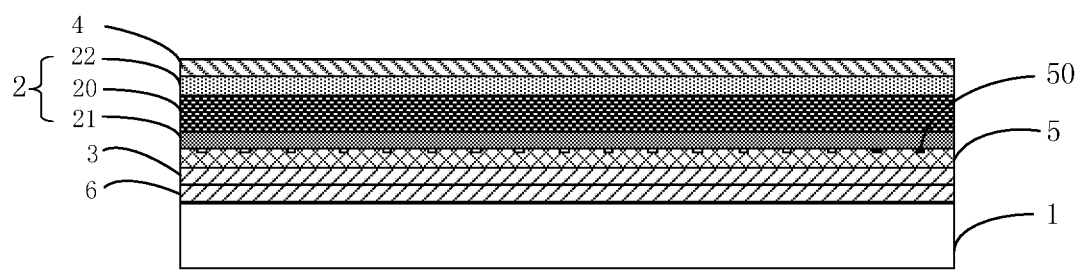
FIG. 1 is a schematic view of a display device in some embodiments of the present disclosure.

Referring to FIG. 1, a display device is provided in some embodiments of the present disclosure, including a display panel 2, a backlight component configured to provide a backlight to the display panel 2 and a display controller, where the backlight component includes a standby display backlight component and a normal display backlight component 1, the standby display backlight component is configured to provide the backlight to the display panel 2 during a standby display. FIG. 1 also shows a first polarized layer 3, a second polarized layer 4, a first transflective film 5, a second transflective film 6, and grooves 50. The display panel 2 includes a liquid crystal layer 20, an array substrate 21, and a color filter substrate 22.

The standby display backlight component provides the backlight to the display panel 2 in the case that the display device displays the information that the display device brings itself during the standby display, the backlight is aligned through liquid crystals in the display panel 2, so as to enable the display device to display the information that the display device brings itself.

As seen from above, the display device includes the standby display backlight component configured to provide the backlight to the display panel 2 during the standby display, so the display device may display independently the information brought by the display device itself during the standby display through the backlight provided by the standby display backlight component to the display panel 2. Therefore, the display device may only display the basic information such as year, month and date brought by the display device itself, resulting in the power consumption for displaying such information being relatively low, and thereby the hardware loss of the display device may not be large.

Figure 2:
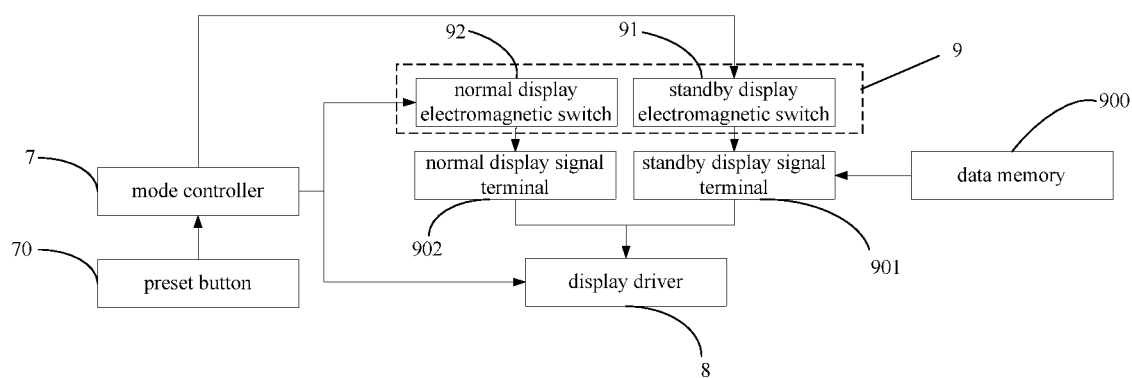
FIG. 2 is a schematic view of a display controller in some embodiments of the present disclosure.

As shown in FIG. 1 and FIG. 2, the display device in some embodiments of the present disclosure includes the display controller and the normal display backlight component 1 including the standby display backlight component. The normal display backlight component 1 and the standby display backlight component are both the backlight components, and such definition is merely to distinguish them when using them in a standby state and a normal state. Alternatively, the normal display backlight component 1 is independent from the standby display backlight component. In other words, the standby display backlight component may be a part of the normal display backlight component 1, or the standby display backlight component may be independent from the normal display backlight component 1.

In some embodiments of the present disclosure, the display controller includes a display driver 8, a data memory 900, a signal switcher 9 (which can include a standby display electromagnetic switch 91 and a normal display electromagnetic switch 92) and a mode controller 7 configured to control the display panel 2 to switch between a normal display mode and a standby display mode. An input end of the mode controller 7 is coupled to a preset button 70. An output end of the mode controller 7 is coupled to a control end of the signal switcher 9, a control end of the display driver 8, a control end of the normal display backlight component 1 and a control end of the standby display backlight component. An output end of the signal switcher 9 is coupled to the normal display signal terminal 902 and the standby display signal terminal 901 coupled to the data memory 900. The normal display signal terminal 902 and the standby display signal terminal 901 are coupled to an input end of the display driver 8. The data memory 900 may store the information brought by the display device itself, such as year, month and date.

In some embodiments of the present disclosure, the present button is directly coupled to the signal switcher 9, thereby it is able to directly control the signal switcher 9 to enable the normal display signal terminal 902 to provide a normal data signal in the case of pressing the present button. The present button may be any button on the display device. For example, in the case that the display device is a mobile phone, the present button may be the "Home" button.

In some embodiments of the present disclosure, the mode controller 7 transmits a first electrical signal to the signal switcher 9, the display driver 8 and the standby display backlight component involved in the normal display backlight component 1, so as to enable the signal switcher 9 to control the standby display signal terminal 901 in response to the first electrical signal to provide the standby data signal stored in the data memory 900. In addition, after receiving the first electrical signal, the display driver 8 controls the display panel 2 to display the standby data signal provided by the standby display signal terminal 901. After receiving the first electrical signal, the standby display backlight component provides the backlight to the display panel 2, so as to realize the standby display. In the case of the normal display, a signal is transmitted to the mode controller 7 through the present button, to enable the mode controller 7 to transmit a second electrical signal to the signal switcher 9, the display driver 8 and the normal display backlight component 1, so as to enable the signal switcher 9 to control in response to the second electrical signal the normal display signal terminal 902 to provide the normal data signal. In addition, after receiving the second electrical signal, the display driver 8 controls the display panel 2 to display the normal data signal provided by the normal display signal terminal 902. After receiving the second electrical signal, the normal display backlight component 1 provides the backlight to the display panel 2, so as to realize the normal display.

As described above, the mode controller 7 is equivalent to a trigger-type signal transmitter, which is not triggered by any signal and may keep transmitting the first electrical signal in the case that the mode controller 7 is energized and no signal is transmitted by the preset button 70, so as to enable the display panel 2 to perform the standby display. In the case that the preset button 70 transmits a signal (i.e., the signal is transmitted by pressing the preset button 70), the mode controller 7 equivalent to a trigger-type signal transmitter is trigger by the signal transmitted by the preset button 70, so as to transmit a second electrical signal to enable the display panel 2 to display the normal data signal provided by the normal display signal terminal 902. Generally, the standby display signal stored in the data memory 900 has few contents such as month and date and the current time, so the display driver 8 does not need to drive all the pixels of the display panel 2 to work. Therefore, according to the display device in some embodiments of the present disclosure, when displaying the information brought by the display device itself, both the power consumption of the display device and the hardware loss thereof may be reduce.

It should be noted that, the data memory 900 in some embodiments of the present disclosure may be a memory of the display device or other external data storage, which is coupled to a timer so as to store the time information calculated in real time by the timer. Of course, the data memory 900 not only stores the information brought by the display device itself but also the normal display signal during the normal display.

Optionally, as shown in FIG. 2, the signal switcher 9 includes a standby display electromagnetic switch 91 and a normal display electromagnetic switch 92, and the standby display electromagnetic switch 91 is at the standby display signal terminal 901, the normal display electromagnetic switch 92 is at the normal display signal terminal 902, and an output end of the mode controller 7 is coupled to a control end of the standby display electromagnetic switch 91 and a control end of the normal display electromagnetic switch 92. It can be seen from the above that, the signal switcher 9 controls certain display signal terminal to provide the signal through the corresponding electromagnetic switch.

For example, when receiving the first electrical signal, the standby display electromagnetic switch 91 controls the standby display signal terminal 901 to provide the standby data signal, and then the standby display backlight component involved in the normal display backlight component 1 provides the backlight to the display panel 2. When receiving the second electrical signal, the normal display electromagnetic switch 92 controls the normal display signal terminal 902 to provide the normal data signal, and then the normal display backlight component 1 provides the backlight to the display panel 2.

It should be appreciated that, as shown in FIG. 1, the display device further includes a first polarizer layer 3 arranged at a light incident surface of the display panel 2 and a second polarizer layer 4 arranged at a light emitting surface of the display panel 2. In order to further reduce the hardware loss of the display device, as shown in FIG. 1, a first transflective film 5 is arranged between the first polarizer layer 3 and the light incident surface of the display panel 2, and a polarization direction of the first transflective film 5 is identical to a polarization direction of the first polarizer layer 3. The display panel 2 generally includes an array substrate 21, a color filter substrate 22 and a liquid crystal layer 20 between the array substrate 21 and the color filter substrate 22.

According to the display device in some embodiments of the present disclosure, the first transflective film 5 is arranged between the first polarizer layer 3 and the light incident surface of the display panel 2. As such, in the standby state of the display device, in the case that there is ambient light transmitting to the display panel 2 through the display surface of the display panel 2, the ambient light may illuminate the first transflective film 5 through the display panel 2 and then be reflected by the first transflective film 5 and enters into the display panel 2. As such, it is able to enable the display panel 2 to have a mirror effect, and display the contents brought by the display device itself or the images through the ambient light reflected by the first transflective film 5 as the backlight without the backlight provided by the standby display backlight component, thereby reducing the power consumption of the display device and the hardware loss thereof.

In addition, the polarization direction of the first transflective film 5 is identical to the polarization direction of the first polarizer layer 3, so the backlight may enter into the display panel 2 through the first polarizer layer 3 smoothly, thereby the display panel 2 may be applied to a liquid crystal displayer in the related art.

Optionally, as shown in FIG. 1, diffuse reflection structures are arranged at a surface of the first transflective film 5 adjacent to the display panel 2, such that the ambient light entering into the display panel 2 may be reflected to different directions by the diffuse reflection structures, thereby the user may view the contents displayed by the display panel 2 in a large viewing angle range. Furthermore, when passing the first transflective film 5, the backlight may also be reflected to different directions by the diffuse reflection structures, thereby the user may view the contents displayed by the display panel 2 in a larger viewing angle range. The diffuse reflection structures may be, for example, irregularly arranged grooves 50 at the surface of the first transflective film 5, or irregularly arranged scratches at the surface of the first transflective film 5.

Furthermore, as shown in FIG. 1, a second transflective film 6 is arranged at a surface of the first polarizer layer 3 away from the display panel 2, so as to form an optical micro-cavity structure together with the standby display backlight component, to enable the backlight provided by the standby display backlight component to be reflected back to the standby display backlight component by the second transflective film 6 before entering into the display panel 2, and then the reflected backlight may cooperate with the backlight originally provided by the standby display backlight component, thereby increasing the picture brightness of the display device.

The standby display backlight component may provide the backlight to the display panel 2 in the case of no ambient light. In view of this, in order to prevent the second transflective film 6 from shielding the backlight, a polarization direction of the second transflective film 6 is arranged to be identical to the polarization direction of the first polarizer layer 3, so as to enable the backlight not reflected by the second transflective film 6 to pass through the second transflective film 6, the first polarizer layer 3 and the first transflective film 5 and then enter into the display panel 2.

In the case of that the ambient light illustrates the display panel 2, the light reflected by the first transflective film 5 may function as the backlight to be provided to the display panel 2, and thereby the standby backlight component may not be used.

In some embodiments of the present disclosure, as shown in FIGS. 1, 3, 4 and 6, the display panel 2 includes a standby display region B within a normal display region A, the normal display backlight component 1 includes a light guide sheet, m normal display light sources 101 corresponding to the normal display region A and k standby display light sources 102 corresponding to the standby display region B. The m normal display light sources 101 and the k standby display light sources 102 are side-light type backlight sources. The m normal display light sources 101 are at a first side of a light incident surface of the light guide sheet, and the k standby display light sources 102 are at a second side of the light incident surface of the light guide sheet.

Figure 3:
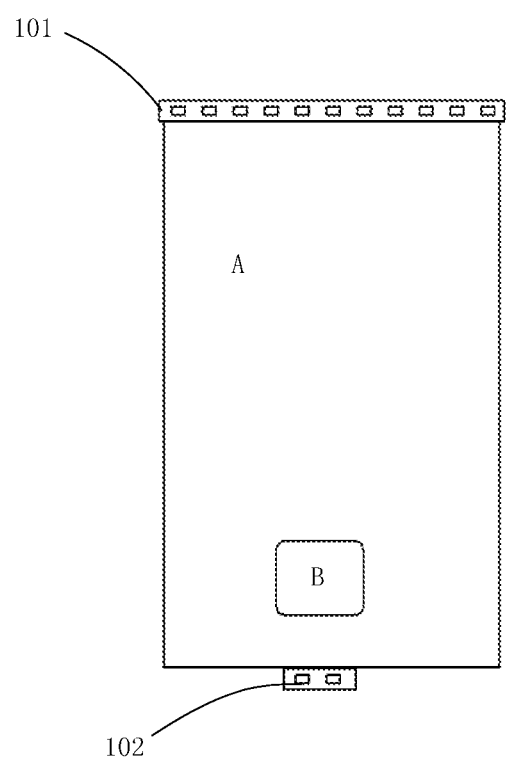
FIG. 3 shows a distribution of light sources of a normal display backlight component.
Figure 4:
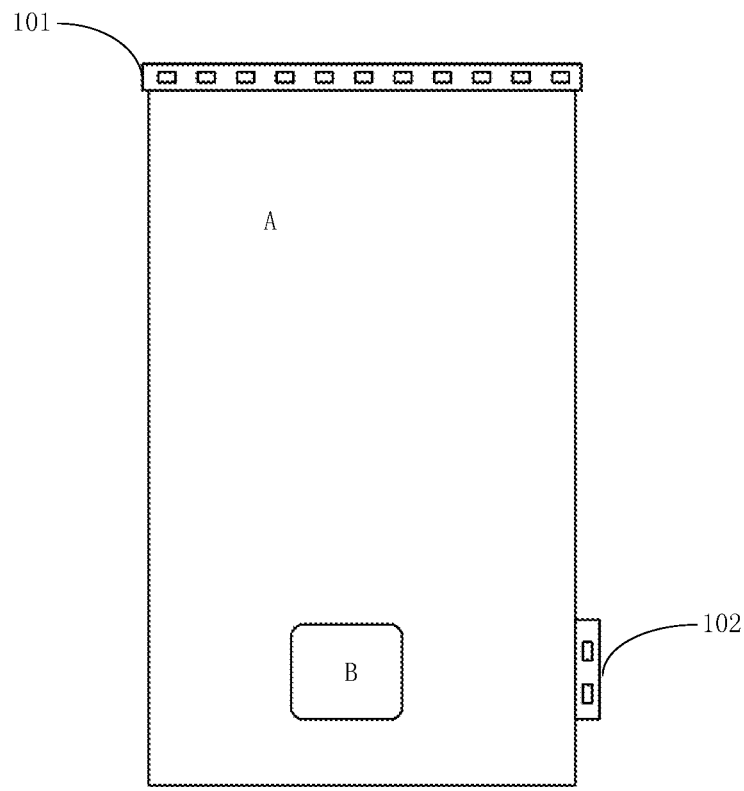
FIG. 4 shows a distribution of light sources of a normal display backlight component.

In some embodiments of the present disclosure, as shown in FIGS. 3 and 4, the first side of the light incident surface of the light guide sheet is adjacent to or opposite to the second side of the light incident surface of the light guide sheet.

A control end of the normal display backlight component 1 includes a normal display backlight controller 15, and a control end of the standby display backlight component includes a standby display backlight controller 14, a light sensor 11, a logical AND gate calculation circuitry 12 and a logical NOT gate calculation circuitry 13.

An output end of the mode controller 7 is coupled to an input end of the normal display backlight controller 15. An output end of the normal display backlight controller 15 is coupled to the m normal display light sources 101. An output end of the light sensor 11 is coupled to a first input end of the logical AND gate calculation circuitry 12. The output end of the mode controller 7 is coupled to a second input end of the logical AND gate calculation circuitry 12. An output end of the logical AND gate calculation circuitry 12 is coupled to an input end of the standby display backlight controller 14 via the logical NOT gate calculation circuitry 13. An output end of the standby display backlight controller 14 is coupled to the k standby display light sources 102.

When there is ambient light, the energized mode controller 7 may transmit the first electrical signal to the logical AND gate calculation circuitry 12 in the case of not being triggered by the preset button 70. After detecting the ambient light, the light sensor 11 may transmit a photoelectric signal to the logical AND gate calculation circuitry 12. At this time, the logical AND gate calculation circuitry 12 may output a high-level signal, and then the high-level signal may be reversed by the logical NOT gate calculation circuitry 13 to a low-level signal. The standby display backlight controller 14, in response to the low-level signal, may not control the k standby display light sources 102 to emit light. As such, it is able to perform the standby display without the backlight.

When there is not ambient light, the energized mode controller 7 may transmit the first electrical signal to the logical AND gate calculation circuitry 12 in the case of not being triggered by the preset button 70. However, the light sensor 11 may not detect any ambient light, so it may not transmit any photoelectric signal to the logical AND gate calculation circuitry 12. At this time, the logical AND gate calculation circuitry 12 may only output a low-level signal, and then the low-level signal may be reversed by the logical NOT gate calculation circuitry 13 to a high-level signal. The standby display backlight controller 14, in response to the high-level signal, may control the k standby display light sources 102 to emit light. As such, the standby display light sources may be turned on, so as to enable the backlight component to provide the backlight to the display panel 2, so that it is able to perform the standby display.

Whether there is ambient light or not, the energized mode controlled, after being trigger by the preset button 70, may transmit a second electrical signal to the normal display backlight controller 15, so as to enable the normal display backlight controller 15 to turn on the m normal display light sources 101.

According to the display device in some embodiments of the present disclosure, the display device may perform the standby display whether there is ambient light or not. In addition, the standby display backlight controller 14 and the normal display backlight controller 15 each is equivalent to an electronic control switch, which is configured to turn on the corresponding display light source when receiving a corresponding signal.

In some embodiments of the present disclosure, the display controller includes the display driver 8, the data memory 900, the signal switcher 9 and the mode controller 7 configured to control the display panel 2 to switch between the normal display mode and the standby display mode. The input end of the mode controller 7 is coupled to the preset button 70. The output end of the mode controller 7 is coupled to the control end of the signal switcher 9, the control end of the display driver 8, the control end of the normal display backlight component 1 and the control end of the standby display backlight component. The output end of the signal switcher 9 is coupled to the normal display signal terminal 902 and the standby display signal terminal 901 coupled to the data memory 900. The normal display signal terminal 902 and the standby display signal terminal 901 are coupled to the input end of the display driver 8. The data memory 900 may store the information brought by the display device itself, such as year, month and date. The present button is directly coupled to the signal switcher 9, thereby it is able to directly control the signal switcher 9 to enable the normal display signal terminal 902 to provide a normal data signal in the case of pressing the present button. The present button may be any button on the display device. For example, in the case that the display device is a mobile phone, the present button may be the "Home" button.

Figure 5:
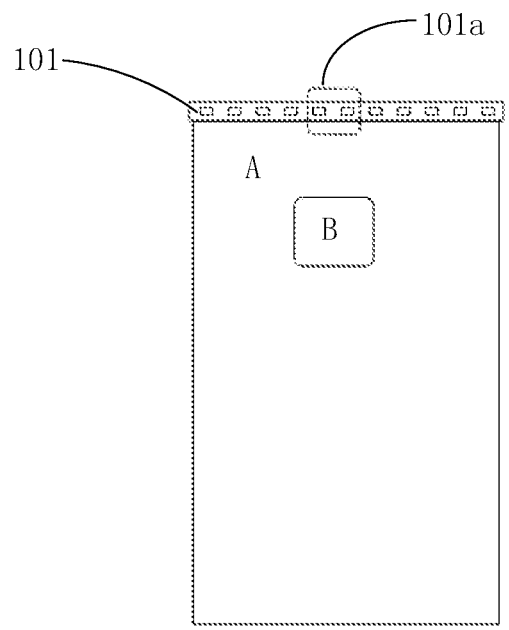
FIG. 5 shows a distribution of light sources of a normal display backlight component.
Figure 6:
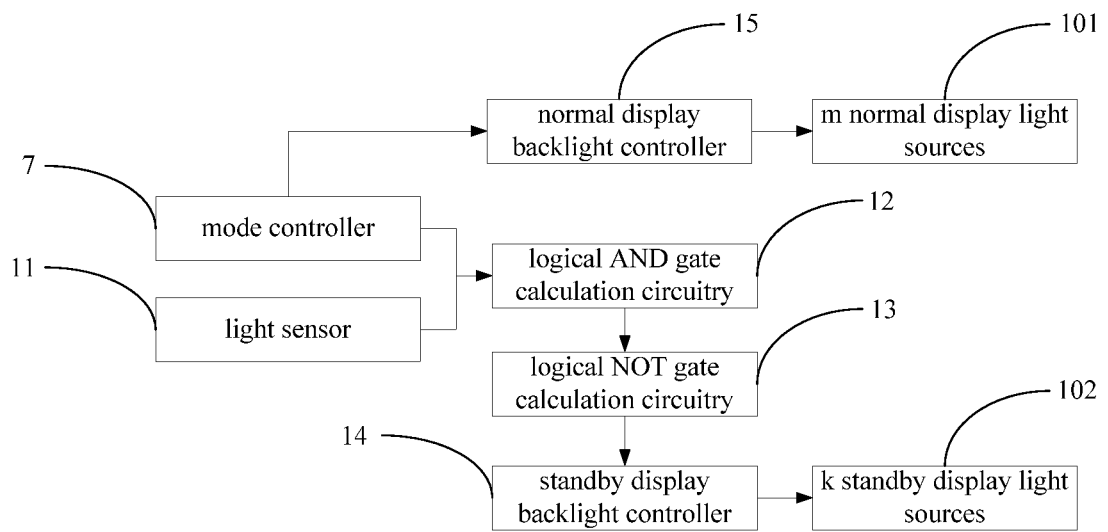
FIG. 6 is a schematic view of a backlight controller in some embodiments of the present disclosure.
Figure 7:
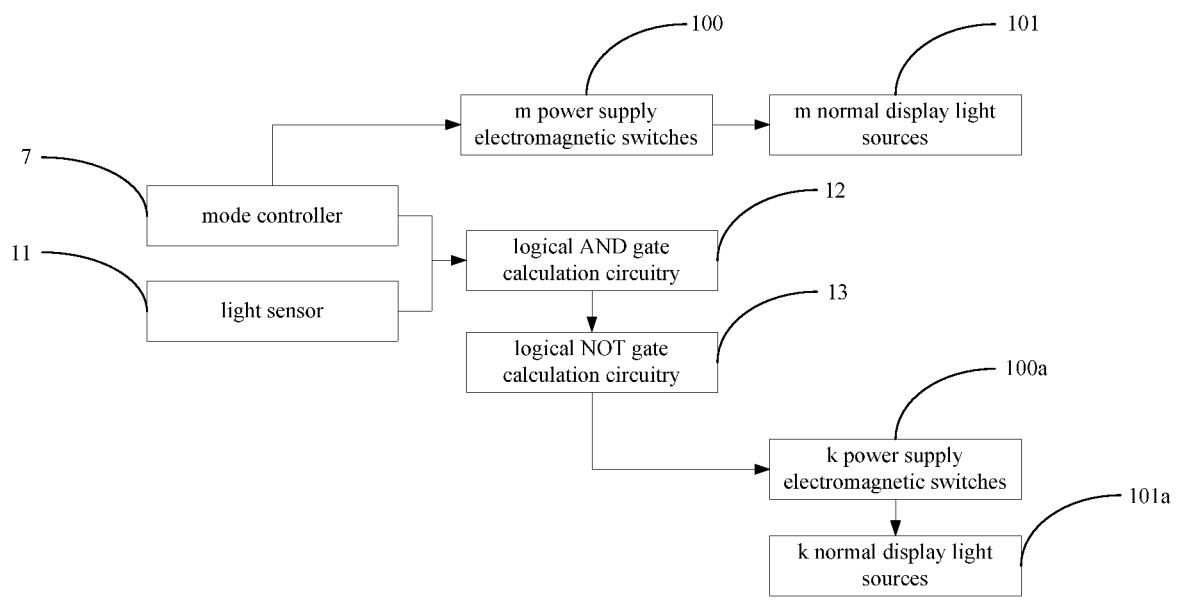
FIG. 7 is a schematic view of a backlight controller in some embodiments of the present disclosure.

As shown in FIGS. 1, 5 and 7, the display panel 2 includes the standby display region B within the normal display region A. The normal display backlight component 1 includes m normal display light sources 101 corresponding to the normal display region A. k normal display light sources 101a of the m normal display light sources 101 function as k standby display light sources corresponding to the standby display region B, where 1<k<m. m normal display light sources 101 are side-light type backlight sources.

The control end of the normal display backlight component 1 includes power supplies and m power supply electromagnetic switches 100 coupled to the power supplies. m normal display light sources 101 are coupled to m power supply electromagnetic switches 100 in a one-to-one correspondence. The control end of the standby display backlight component includes the light sensor 11, the logical AND gate calculation circuitry 12 and the logical NOT gate calculation circuitry 13.

The output end of the mode controller 7 is coupled to the control end of the power supply electromagnetic switch, the output end of the light sensor 11 is coupled to the first input end of the logical AND gate calculation circuitry 12, the output end of the mode controller 7 is coupled to the second input end of the logical AND gate calculation circuitry 12, the output end of the logical AND gate calculation circuitry 12 is coupled to, via the logical NOT gate calculation circuitry 13, the control end of the power supply electromagnetic switch of each standby display light sources.

When there is ambient light, the display panel 2 may perform the standby display without ambient light. The energized mode controller 7 may transmit the first electrical signal to the logical AND gate calculation circuitry 12 in the case of not being triggered by the preset button 70. After detecting the ambient light, the light sensor 11 may transmit a photoelectric signal to the logical AND gate calculation circuitry 12. At this time, the logical AND gate calculation circuitry 12 may output a high-level signal, and then the high-level signal may be reversed by the logical NOT gate calculation circuitry 13 to a low-level signal. As such, the k power supply electromagnetic switches 100a corresponding to the k normal display light sources 101a serving as the k standby display light sources may not be switched on, so the k standby display light sources may not be turned on. As such, it is able to perform the standby display without the backlight.

When there is not ambient light, the energized mode controller 7 may transmit the first electrical signal to the logical AND gate calculation circuitry 12 in the case of not being triggered by the preset button 70. However, the light sensor 11 may not detect any ambient light, so it may not transmit any photoelectric signal to the logical AND gate calculation circuitry 12. At this time, the logical AND gate calculation circuitry 12 may only output a low-level signal, and then the low-level signal may be reversed by the logical NOT gate calculation circuitry 13 to a high-level signal. As such, the k power supply electromagnetic switches 100a corresponding to the k normal display light sources 101a serving as the k standby display light sources may be switched on, so the k normal display light sources 101a may be turned on. As such, it is able to perform the standby display.

Whether there is ambient light or not, the energized mode controlled, after being trigger by the preset button 70, may transmit a second electrical signal to the m power supply electromagnetic switches 100, so as to switch on the m power supply electromagnetic switches 100 and enable the power supplies to turn on the m normal display light sources 101.

According to the display device in some embodiments of the present disclosure, the display device may perform the standby display whether there is ambient light or not. In addition, after the corresponding signal is received, the m power supply electromagnetic switches 100 are controlled to turn on the corresponding to m normal display light sources 101, or the k power supply electromagnetic switches 100a are controlled to turn on the k normal display light sources 101a of the m normal display light sources 101 serving as the standby display light sources. As such, it is able to perform the standby display with or without the backlight, reduce the cost and simplify the control process.

Figure 8:
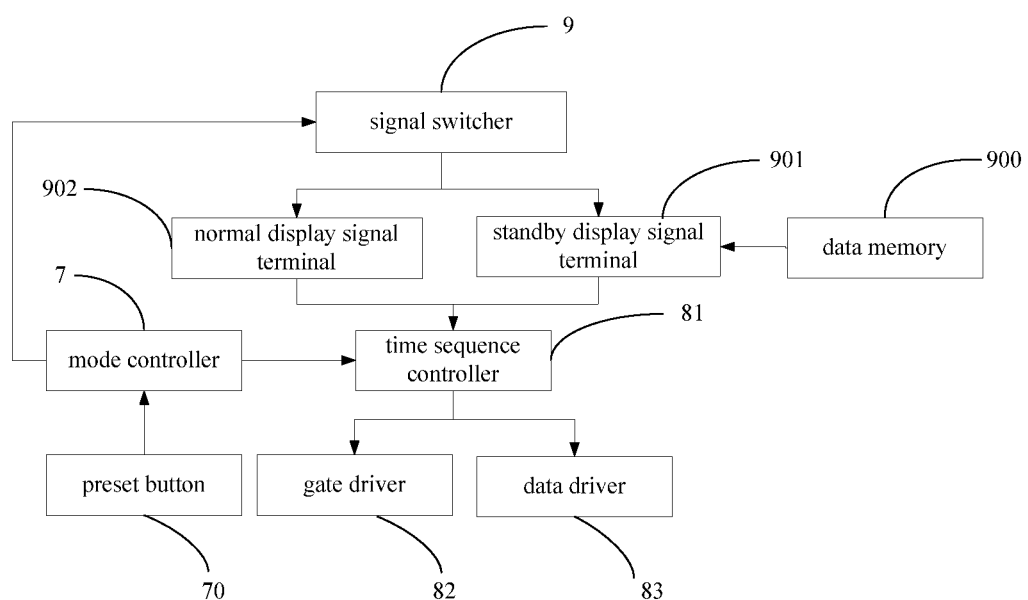
FIG. 8 is a schematic view of a display driver in some embodiments of the present disclosure.

In some embodiments of the present disclosure, as shown in FIG. 1 and FIG. 8, the display driver 8 includes a time sequence controller 81, a data driver 83 and a gate driver 82, and the display panel 2 includes an array substrate 21 including thin film transistors arranged in an array form. The output end of the mode controller 7 is coupled to a control end of the time sequence controller 81, the normal display signal terminal 902 and the standby display signal terminal 901 are coupled to an input end of the time sequence controller 81, an output end of the time sequence controller 81 is coupled to an input end of the data driver 83 and an input end of the gate driver 82, an output end of the data driver 83 is coupled to a signal input end of each thin film transistor, and an output end of the gate driver 82 is coupled to a control end of each thin film transistor.

During the standby display, the mode controller 7 transmits the first electrical signal to the time sequence controller 81 to turn on the time sequence controller 81, so as to enable the time sequence controller 81 to receive the standby data signal and transmit the standby data signal to the gate drive and the data driver 83 to display the standby data signal. During the normal display, the mode controller 7 transmits the second electrical signal to the time sequence controller 81 to turn on the time sequence controller 81, so as to enable the time sequence controller 81 to receive the normal data signal to display the normal data signal.

In addition, in the case that the gate driver 82 is a GOA circuitry, the gate driving circuitry is arranged on the array substrate 21, and the driving circuitry may turn on the thin film transistors in respective rows in sequence, whether the display device is in the standby display state or the normal display state. However, during the standby display, the data driver 83 provides the standby data signals to only a certain columns of data lines. Therefore, during the standby display, although the gate driver 82 turns on the thin film transistors in respective rows in sequence, not all of the thin film transistors work.

It should be noted that, the term "coupled to" in the present disclosure may refer to "directly coupled to" or "indirectly coupled to" via other intermediate components.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A display device comprising:
   a display panel; and
   a backlight component configured to provide a backlight to the display panel and a display controller,
   wherein the backlight component includes a standby display backlight component and a normal display backlight component, with the standby display backlight component being configured to provide the backlight to the display panel during a standby display mode,
   wherein the display controller includes a display driver, a data memory, a signal switcher, and a mode controller configured to control the display panel to switch between a normal display mode and the standby display mode,
   wherein an input end of the mode controller is coupled to a preset button and configured to control the signal switcher, the display driver, the normal display backlight component, and the standby display backlight component, and wherein the signal switcher is configured to control a normal display signal terminal and a standby display signal terminal, and
   wherein the signal switcher comprises a standby display electromagnetic switch and a normal display electromagnetic switch, with the standby display electromagnetic switch being at the standby display signal terminal, the normal display electromagnetic switch being at the normal display signal terminal, and an output end of the mode controller being coupled to a control end of the standby display electromagnetic switch and a control end of the normal display electromagnetic switch.

2. The display device according to claim 1, wherein an output end of the mode controller is coupled to a control end of the signal switcher, a control end of the display driver, a control end of the normal display backlight component, and a control end of the standby display backlight component, wherein an output end of the signal switcher is coupled to the normal display signal terminal, wherein the standby display signal terminal is coupled to the data memory, and wherein the normal display signal terminal and the standby display signal terminal are coupled to an input end of the display driver.

3. The display device according to claim 1, wherein the display driver includes a time sequence controller, a data driver, and a gate driver, the display panel includes an array substrate comprising thin film transistors arranged in an array form, and wherein:
   an output end of the mode controller is coupled to a control end of the time sequence controller;
   the normal display signal terminal and the standby display signal terminal are coupled to an input end of the time sequence controller;
   an output end of the time sequence controller is coupled to an input end of the data driver and an input end of the gate driver;
   an output end of the data driver is coupled to a signal input end of each thin film transistor; and
   an output end of the gate driver is coupled to a control end of each thin film transistor.

4. The display device according to claim 1, wherein the display panel includes a standby display region within a normal display region, with a plurality of normal display light sources corresponding to the normal display region, wherein the normal display backlight component comprises a light guide sheet, and wherein a part of the normal display light sources functions as standby display light sources corresponding to the standby display region.

5. The display device according to claim 4, wherein a control end of the standby display backlight component comprises a light sensor, a logical AND gate calculation circuitry, and a logical NOT gate calculation circuitry, and the display device further comprises:
   an output end of the mode controller coupled to a control end of a power supply electromagnetic switch;
   an output end of the light sensor coupled to a first input end of the logical AND gate calculation circuitry;
   the output end of the mode controller coupled to a second input end of the logical AND gate calculation circuitry; and
   an output end of the logical AND gate calculation circuitry coupled to the control end of the power supply electromagnetic switch of each standby display light sources via the logical NOT gate calculation circuitry.

6. A display device, comprising:
   a display panel; and
   a backlight component configured to provide a backlight to the display panel and a display controller,
   wherein the backlight component includes a standby display backlight component and a normal display backlight component, with the standby display backlight component being configured to provide the backlight to the display panel during a standby display mode,
   wherein the display controller includes a display driver, a data memory, a signal switcher, and a mode controller configured to control the display panel to switch between a normal display mode and the standby display mode, and wherein a first polarizer layer is at a light incident surface of the display panel, a second polarizer layer is at a light emitting surface of the display panel, the first polarizer layer is between a light emitting surface of the standby display backlight component and the light incident surface of the display panel, and the display device further comprises:
- a first transflective film between the first polarizer layer and the light incident surface of the display panel, with a polarization direction of the first transflective film being identical to a polarization direction of the first polarizer layer; and
- a second transflective film at a surface of the first polarizer layer away from the display panel, with a polarization direction of the second transflective film being identical to a polarization direction of the first polarizer layer.

7. The display device according to claim 6, wherein a diffuse reflection structure is at a surface of the first transflective film adjacent to the display panel.

8. A display device, comprising:
a display panel; and
a backlight component configured to provide a backlight to the display panel and a display controller,
wherein the backlight component includes a standby display backlight component and a normal display backlight component, with the standby display backlight component being configured to provide the backlight to the display panel during a standby display mode,
wherein the display controller includes a display driver, a data memory, a signal switcher, and a mode controller configured to control the display panel to switch between a normal display mode and the standby display mode, and
wherein the display panel comprises a standby display region within a normal display region, with a plurality of normal display light sources corresponding to the normal display region and a plurality of standby display light sources corresponding to the standby display region, wherein the normal display backlight component comprises a light guide sheet, wherein the normal display light sources are at a first side of a light incident surface of the light guide sheet, and the standby display light sources are at a second side of the light incident surface of the light guide sheet.

9. The display device according to claim 8, wherein a control end of the normal display backlight component comprises a normal display backlight controller, a control end of the standby display backlight component comprises a standby display backlight controller, a light sensor, a logical AND gate calculation circuitry, and a logical NOT gate calculation circuitry, and the display device further comprises:
- an output end of the mode controller coupled to an input end of the normal display backlight controller;
- an output end of the normal display backlight controller coupled to the normal display light sources;
- an output end of the light sensor coupled to a first input end of the logical AND gate calculation circuitry;
- the output end of the mode controller coupled to a second input end of the logical AND gate calculation circuitry;
- an output end of the logical AND gate calculation circuitry coupled to an input end of the standby display backlight controller via the logical NOT gate calculation circuitry; and
- an output end of the standby display backlight controller coupled to the standby display light sources.

10. The display device according to claim 8, wherein the normal display light sources and the standby display light sources are side-light type backlight sources, and the first side of the light incident surface of the light guide sheet is adjacent to the second side of the light incident surface of the light guide sheet.

11. The display device according to claim 8, wherein the normal display light sources and the standby display light sources are side-light type backlight sources, and the first side of the light incident surface of the light guide sheet is opposite to the second side of the light incident surface of the light guide sheet.

* * * * *